Patented July 22, 1947

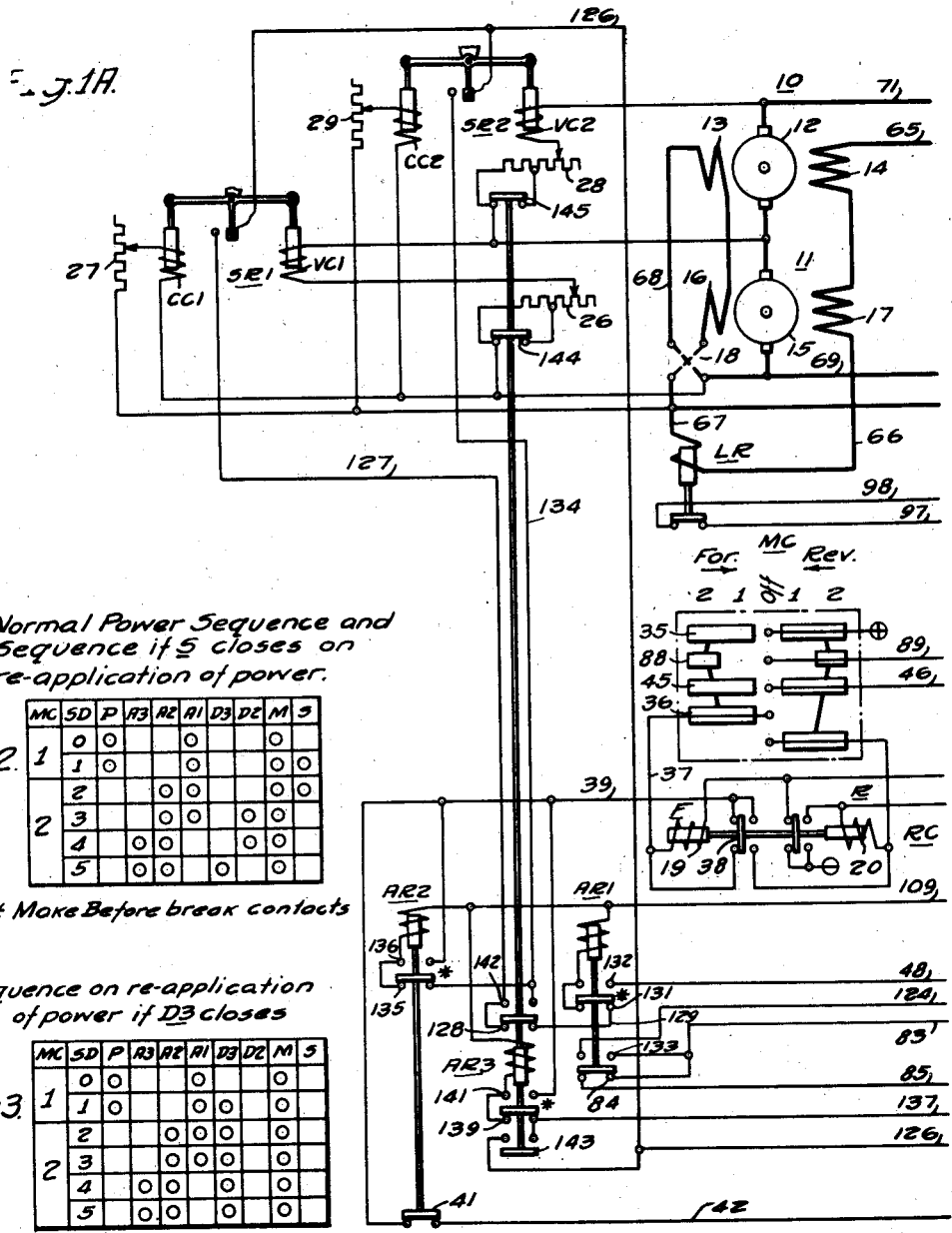

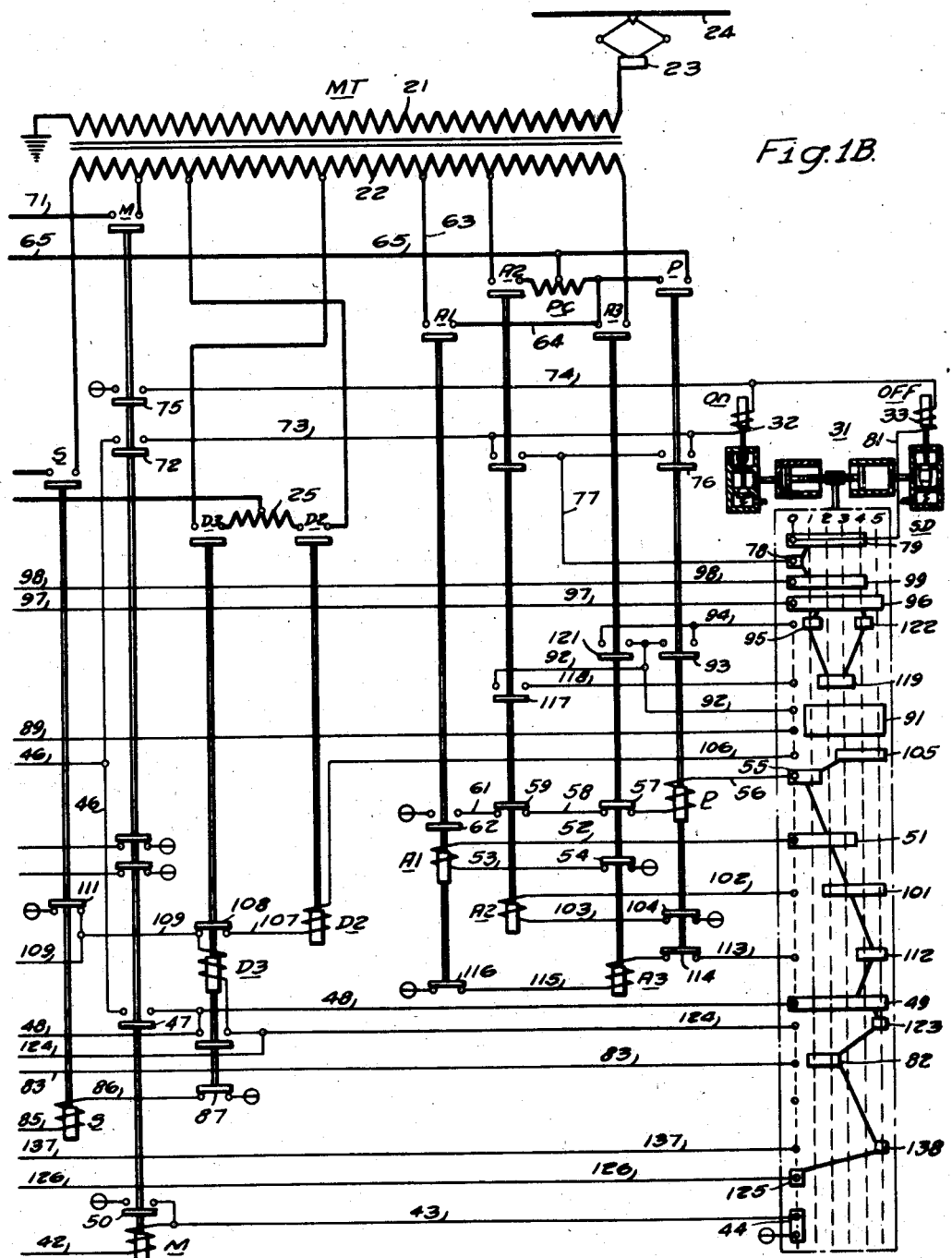

2,424,326

UNITED STATES PATENT OFFICE 2,424,326

DOUBLY-FED REPULSION MOTOR CONTROL SYSTEM

Simeon E. Newhouse, Edgewood, and William H. Eunson, Wilkinsburg, Pa., assignors to Westinghouse Electric Corporation, East Pittsburgh, Pa., a corporation of Pennsylvania Application July 2, 1945, Serial No. 602,872

10 Claims. (Cl. 172—179)

Our invention relates, generally, to control systems and, more particularly, to systems for controlling the operation of the propelling motors of railway vehicles.

During the operation of railway vehicles which are propelled by alternating current motors of the doubly-fed, repulsion starting type, it is important that the repulsion connections be established when starting from standstill or when reapplying power at low speeds. When reapplying power at medium speeds, the doubly-fed connections must be established instead of the repulsion connections to prevent the motors from flashing-over. When power is reapplied at high speeds, the motors may flash-over even though the doubly-fed connections have been established. A large number of motors have been damaged by flash-overs because the present method of selecting the motor connections for power reapplication permits the repulsion connections to be made at too high a speed and because no means is provided for preventing the operator from restoring power to the motors at high speeds.

An object of our invention, generally stated, is to provide a motor control system which shall be simple and efficient in operation and which may be economically manufactured and installed.

A more specific object of our invention is to provide anti-flash protection at all speeds of a doubly-fed, repulsion starting motor.

Another object of our invention is to provide for establishing connections for reapplying power to a motor in accordance with the motor speed.

A further object of our invention is to prevent the reapplication of power to a motor above a pretetermined speed.

Another object of our invention is to prevent overspeeding of a motor.

Other objects of our invention will be explained fully hereinafter or will be apparent to those skilled in the art.

In accordance with one embodiment of our invention, speed responsive relays and auxiliary relays cooperate to select switches for making the proper connections to reapply power to the motors of a vehicle at low and medium speeds. Reapplication of power is prevented above a predetermined speed and overspeeding of the motors is also prevented by operation of the relays.

For a fuller understanding of the nature and objects of our invention, reference may be had to the following detailed description taken in conjunction with the accompanying drawing, in which:

Figures 1A and 1B, when combined, constitute a diagrammatic view of a control system embodying our invention; and Figures 2 and 3 are charts showing the sequence of operation of part of the apparatus illustrated in Figures 1A and 1B.

Referring to the drawing, the system shown therein controls the operation of a pair of traction motors 10 and 11 which are of the doubly-fed, repulsion starting type suitable for propelling a railway vehicle (not shown). The motor 10 has an armature winding 12, a main field winding 13 and an auxiliary field winding 14. The motor 11 has an armature winding 15, a main field winding 16 and an auxiliary field winding 17.

In accordance with the usual practice, the direction of operation of the motors 10 and 11 is controlled by a reversing switch 18, the operation of which is controlled by a master controller MC which controls the energization of solenoid windings 19 and 20 of a reversing controller RC for operating the reversing switch 18 in a manner well known in the art. The power for operating the motors 10 and 11 may be supplied through a main transformer MT, having a primary winding 21 and a secondary winding 22. The main transformer may be energized through a current collector 23 which engages a trolley conductor 24. The trolley conductor 24 may be energized from any suitable source of power, such as an alternating current generator system (not shown).

The motors 10 and 11 may be connected to the secondary winding 22 of the transformer by means of a switch M and tap-changing switches A1, A2 and A3. A preventive coil PC functions in the usual manner to prevent short-circuiting portions of the transformer winding during the tap-changing operations. A switch P is closed during a part of the tap-changing sequence to shunt a portion of the preventive coil from the motor circuit.

Tap-changing switches D2 and D3, which are connected to a reactor 25, are provided for establishing the doubly-fed connections for the motors 10 and 11. A switch S is provided for establishing the repulsion connections when starting from standstill or when reapplying power to the motors at low speeds.

In order to selectively control the operation of the proper switches for reapplying power at low and medium speeds and to prevent the reapplication of power at high speeds, speed responsive relays SR1 and SR2 and auxiliary relays AR1, AR2 and AR3 are provided. As will be more fully explained hereinafter, these relays also function to prevent overspeeding of the motors 10 and 11.

As shown, the relays SR1 and SR2 are of the balanced beam type. The relay SR1 has a voltage coil VC1 which is connected across the armature winding 15 of the motor 11 and a current coil CC1 which is connected across the field windings 13 and 16. The relay SR2 has a voltage coil VC2 which is connected across the armature winding 12 of the motor 10 and a current coil CC2 which is connected across the field windings 13 and 16. Calibrating resistors 26, 27, 28 and 29 are provided for the coils VC1, CC1, VC2 and CC2, respectively. It will be understood that these relays may be set to operate at any desired speed of the motors by properly adjusting the calibrating resistors.

In accordance with the usual practice, the operation of the switches A1, A2, A3, D2, D3 and S is controlled by a sequence drum SD which is driven by an air engine 31. The operation of the air engine 31 is controlled by an "on" magnet valve 32 and an "off" magnet valve 33. The energization of the magnet valve 33 is controlled by a current limit relay LR which is responsive to the current flowing through the auxiliary field windings 14 and 17 of the motors 10 and 11. In this manner, the progression of the sequence drum SD is stopped when the current flowing through the relay LR exceeds a predetermined amount.

In order that the functioning of the foregoing apparatus may be more clearly understood, the operation will now be described in more detail. Assuming that it is desired to start the vehicle in a forward direction from standstill, the controller MC is actuated to position 1 in the forward direction.

At this time, the switches P, A1 and M are closed as indicated by the sequence chart in Fig. 2. The energizing circuit for the switch M extends from positive at the controller MC through contact segments 35 and 36, conductor 37, an interlock 38 on the reversing controller RC, conductor 39, contact members 41 of the relay AR2, conductor 42, the actuating coil of the switch M, conductor 43 and a contact segment 44 of the sequence drum SD to negative. A holding circuit for the switch M is established through an interlock 50.

The energizing circuit for the switch A1 may be traced from positive at the controller MC, through contact segments 35 and 45, conductor 46, an interlock 47 on the switch M, conductor 48, contact segments 49 and 51 of the sequence drum SD, conductor 52, the actuating coil of the switch A1, conductor 53 and an interlock 54 on the switch A3 to negative. The energizing circuit for the switch P extends from a contact segment 55 on the sequence drum SD, through conductor 56, the actuating coil of the switch P, an interlock 57 on the switch A3, conductor 58, an interlock 59 on the switch A2, conductor 61 and an interlock 62 on the switch A1 to negative.

The closing of the switches A1, P and M connects the motors 10 and 11 across a portion of the secondary winding 22 of the transformer MT through a circuit which extends from the transformer winding 22, through conductor 63, switch A1, conductor 64, switch P, conductor 65, the field windings 14 and 17, conductor 66, the limit relay LR, conductor 67, reversing switch 18, field windings 16 and 13, conductor 68, reversing switch 18, conductor 69, the armature windings 15 and 12, conductor 71 and the switch M to the transformer winding 22.

Following the closing of the switch M, the magnet valves 32 and 33 are energized thereby causing the air engine 31 to operate the sequence drum SD. The energizing circuit for the magnet valve 32 extends from the previously energized conductor 46 through an interlock 72 on the switch M, conductor 73, the actuating coil of the magnet valve 32, conductor 74, and an interlock 75 on the switch M to negative. The energizing circuit for the magnet valve 33 may be traced from the previously energized conductor 73, through an interlock 76 on the switch P, conductor 77, contact segments 78 and 79 on the sequence drum SD, conductor 81, the actuating coil of the magnet valve 33, conductor 74 and the interlock 75 to negative.

When the sequence drum advances to position 1, the switch S is closed to establish the repulsion connections for starting the motors 10 and 11. The energizing circuit for the switch S may be traced from a contact segment 82 on the sequence drum SD, through conductor 83, contact members 84 of the relay AR1, conductor 85, the actuating coil of the switch S, conductor 86 and an interlock 87 on the switch D3 to negative.

When the master controller MC is actuated to position 2, the sequence drum SD is advanced to position 2. The energizing circuit for the magnet valve 32 remains the same as previously traced. The energizing circuit for the magnet valve 33 may be traced from a contact segment 88 on the controller MC through a conductor 89, a segment 91 on the drum SD, conductor 92, an interlock 93 on the switch P, conductor 94, segments 95 and 96 on the drum SD, conductor 97, the contact members of limit relay LR, conductor 98, contact segments 99 and 79 on the controller SD, conductor 81, the actuating coil of the magnet valve 33 and thence to negative through a circuit previously traced.

When the sequence drum is advanced to position 2, the switch A2 is closed and switch P is opened to increase the voltage applied to the motors 10 and 11 in a manner well known in the art. The energizing circuit for the switch A2 extends from a segment 101 on the drum SD through conductor 102, the actuating coil of the switch A2, conductor 103 and an interlock 104 on the switch P to negative.

Following the closing of the switch A2, the sequence drum SD is advanced to position 3 to open the switch S and to close the switch D2, thereby establishing the doubly-fed connections for the motors 10 and 11 in a manner well known in the art. The energizing circuit for the switch D2 extends from a segment 105 on the drum SD through conductor 106, the actuating coil of the switch D2, conductor 107, an interlock 108 on the switch D3, conductor 109 and an interlock 111 on the switch S to negative.

The sequence drum continues to advance under the control of the limit relay LR to position 4, thereby opening switch A1 and closing the switch A3 to increase the voltage applied to the motors. The energizing circuit for the switch A3 extends from a segment 112 on the drum SD, through conductor 113, an interlock 114 on the switch P, the actuating coil of the switch A3, conductor 115 and an interlock 116 on the switch A1 to negative.

It will be noted that the energizing circuit for the magnet valve 33 was transferred from the interlock 93 on the switch P to an interlock 117 on the switch A2 upon closing of the switch A2 and the opening of the switch P. Thus, the energizing circuit was extended from the conductor 92 through the interlock 117, conductor 118, a segment 119 and thence to the magnet valve 33 through a circuit previously traced. Likewise, the energizing circuit for the magnet valve 33 was transferred from the interlock 117 to an interlock 121 upon the closing of the switch A3. The energizing circuit now extends from the conductor 92, through the interlock 121, conductor 94, a segment 122 on the drum SD and thence to the magnet valve 33 through a circuit previously traced.

Following the closing of the switch A3, the sequence drum advances to position 5, thereby opening the switch D2 and closing the switch D3. The energizing circuit for the switch D3 extends from a segment 123 on the drum SD, through conductor 124, the actuating coil of the switch D3, conductor 109 and the interlock 111 on the switch S to negative. The closing of the switch D3 applies maximum voltage to the motors and completes the normal power sequence when the vehicle is started from standstill.

The operation of the system will now be described in case power is shut off from the motors by actuating the master controller MC to the "off" position, and then reapplied to the motors by actuating the master controller to the running position while the vehicle is still in motion. As explained hereinbefore, the speed responsive relays SR1 and SR2 cooperate with the relays AR1, AR2 and AR3 to select the proper switch, either S or D3, to establish either the repulsion connections or the doubly-fed connections in accordance with the speed of the vehicle when power is reapplied. As further explained hereinbefore, the relays SR1 and SR2 may be adjusted to operate at any desired speed. Thus, it may be assumed that the relay SR1 is set at 24 miles per hour and the relay SR2 is set at 55 miles per hour.

If power is reapplied below 24 miles per hour, the switch S is closed to establish the repulsion connections for the motors. Under these conditions, the energizing circuit for the switch S is established through the contact segment 82 on the sequence drum SD and the contact members 84 of the relay AR1 as previously explained. Following the closing of the switch S, the sequence drum SD advances to close the switches A2, D2, A3 and D3 in the manner hereinbefore explained and as indicated in the sequence chart shown in Fig. 2.

If power is reapplied at speeds of 24 to 54 miles per hour, the contact members of the relay SR1 are closed. The closing of the contact members of the relay SR1 energizes the relay AR1, thereby opening the contact members 84 of this relay to prevent the closing of the switch S and cause the switch D3 to be closed when the sequence drum advances to position 1. The energizing circut for the relay AR1 may be traced from a segment 125 on the drum SD through conductor 126, the contact members of the relay SR1, conductor 127, an interlock 128 on the relay AR3, conductor 129, contact members 131 on the relay AR1, the actuating coil of the relay AR1, conductor 109 and the interlock 111 on the switch S to negative.

The relay AR1 will hold itself in by means of its transfer contact members 132 which are closed before the circuit through the contact members 131 is interrupted. Thus, the actuating coil of the relay AR1 is maintained energized from the conductor 48, thereby insuring that the relay closes and remains closed.

The energizing circuit for the switch D3 extends from the conductor 83 through contact members 133, on the relay AR1, conductor 124 and thence through the actuating coil of the switch D3 to negative through a circuit previously traced. In this manner, the switch D3 is closed to establish the doubly-fed connections for the motors which, as explained hereinbefore, is necessary to prevent flashing of the motors when power is reapplied while operating at medium speeds.

If the operator attempts to reapply power at 55 miles per hour or higher, the contact members of both relays SR1 and SR2 will close, and both auxiliary relays AR1 and AR2 will close. The energizing circuit for the relay AR2 extends from the conductor 126, through the contact members of the relay SR2, conductor 134, contact members 135 of the relay AR2, the actuating coil of the relay AR2 and thence to negative through the conductor 109 and the interlock 111 on the switch S. The relay AR2 is held closed by its transfer contact members 136, which transfer the energizing circuit for the coil of the relay to the conductor 39 before the circuit through the contact members 135 is interrupted.

The operation of the relay AR2 opens the circuit through its contact members 41, thereby interrupting the energizing circuit for the switch M. The opening of the switch M will break the circuit through its interlock 47 thereby deenergizing the conductor 48 and the contact segment 49 of the sequence drum which will prevent the switch D3 from being closed. Therefore, the operator will have to return the controller MC to the "off" position and reduce the speed of the vehicle to less than 55 miles per hour before power can be restored to the motors.

When the sequence drum reaches position 5 during normal acceleration or following a reapplication of power, a conductor 137 is energized through a segment 138 on the sequence drum. The energization of the conductor 137 energizes the actuating coil of the relay AR3 through its contact members 139. The relay AR3 will close and hold itself closed through its contact members 141 which transfer the energizing circuit to the conductor 39.

The operation of the relay AR3 transfers the circuit established by the contact members of the relay SR1 and the contact members 128 of the relay AR3 to the energizing circuit for the relay AR2 through contact members 142 of the relay AR3. At the same time, the conductor 126, which energizes the contact members for both relays SR1 and SR2, is connected to the conductor 137 through contact members 143 of the relay AR3.

Also at this time, contact members 144 and 145 of the relay AR3 are opened to insert additional resistance in the voltage coils of the relays SR1 and SR2, thereby raising the settings of both speed relays to, say, 68 miles per hour. When this speed is reached, one or both of the speed responsive relays will close their contact members to energize the relay AR2. The operation of the relay AR2 will deenergize the actuating coil for the switch M in the manner hereinbefore explained, thereby disconnecting the motors from the power source. In order to reapply power after overspeeding, the operator must return the controller to the "off" position and reduce the speed to less than 55 miles per hour. Thus, it will be seen that overspeed protection is provided for both motors.

From the foregoing description, it is apparent that we have provided a control system which affords anti-flash protection for the motors of a vehicle by selecting the switches for establishing the proper connections for the motors when power is reapplied at certain speeds, and preventing the reapplication of power above a predetermined speed. The present system also provides protection against overspeeding of one or more than one of the propelling motors of a vehicle.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a control system having a transformer for supplying current to a doubly-fed repulsion starting motor, in combination, switching means for establishing the repulsion connections, additional switching means for establishing the doubly-fed connections, and relay means responsive to different speeds of the motor for selectively controlling the operation of said switching means in accordance with the motor speed when power is reapplied to the motor.

2. In a control system having a transformer for supplying current to a doubly-fed repulsion starting motor, in combination, switching means for establishing the repulsion connections, additional switching means for establishing the doubly-fed connections, and relay means responsive to different amounts of armature voltage and main field current of the motor for selectively controlling the operation of said switching means when power is reapplied to the motor.

3. In a control system having a transformer for supplying current to a doubly-fed repulsion starting motor, in combination, switching means for establishing the repulsion connections, additional switching means for establishing the doubly-fed connections, relay means responsive to different speeds of the motor, and auxiliary relay means cooperating with said speed responsive relay means to selectively control the operation of said switching means when power is reapplied to the motor.

4. In a control system having a transformer for supplying current to a doubly-fed repulsion starting motor, in combination, switching means for establishing the repulsion connections, additional switching means for establishing the doubly-fed connections, relay means responsive to different amounts of armature voltage and main field current of the motor, and auxiliary relay means cooperating with said first-named relay means to selectively control the operation of said switching means during the reapplication of power to the motor.

5. In a control system having a transformer for supplying current to a doubly-fed repulsion starting motor, in combination, switching means for establishing the repulsion connections, additional switching means for establishing the doubly-fed connections, relay means responsive to different motor speeds for selectively controlling the operation of said switching means in accordance with the motor speed when power is reapplied to the motor, and additional relay means for preventing the reapplication of power to the motor while operating above a predetermined speed.

6. In a control system having a transformer for supplying current to a doubly-fed repulsion starting motor, in combination, switching means for establishing the repulsion connections, additional switching means for establishing the doubly-fed connections, relay means responsive to different speeds of the motor, and auxiliary relay means cooperating with said speed-responsive relay means to prevent the reapplication of power to the motor while operating above a predetermined speed.

7. In a control system having a transformer for supplying current to a doubly-fed repulsion starting motor, in combination, switching means for establishing the repulsion connections, additional switching means for establishing the doubly-fed connections, relay means responsive to different speeds of the motor for selectively controlling the operation of said switching means in accordance with the motor speed when power is reapplied to the motor, a switch for disconnecting the motor from the transformer, and additional relay means for causing said switch to open when the motor exceeds a predetermined speed.

8. In a control system, the combination with a pair of doubly-fed repulsion starting motors and a power transformer for the motors, of switching means for establishing the repulsion connections, additional switching means for establishing the doubly-fed connections, and a pair of relays responsive to predetermined different speeds of the motors for selectively controlling the operation of said switching means when power is reapplied to the motors.

9. In a control system, the combination with a pair of doubly-fed repulsion starting motors and a power transformer for the motors, of switching means for establishing the repulsion connections, additional switching means for establishing the doubly-fed connections, a pair of relays responsive to predetermined different speeds of the motors, and auxiliary relays cooperating with said speed-responsive relays to prevent the reapplication of power to the motors while operating above a predetermined speed.

10. In a control system, the combination with a pair of doubly-fed repulsion starting motors and a power transformer for the motors, of switching means for establishing the repulsion connections, additional switching means for establishing the doubly-fed connections, a pair of relays responsive to predetermined different speeds of the motors, and auxiliary relays cooperating with said speed-responsive relays to selectively control the operation of said switching means when power is reapplied to the motor and to prevent the reapplication of power to the motors while operating above a predetermined speed.

SIMEON E. NEWHOUSE.
WILLIAM H. EUNSON.

REFERENCES CITED

The following references are of record in the file of this patent:

UNITED STATES PATENTS

| Number | Name | Date |
|---|---|---|
| 1,157,313 | Latour | Oct. 19, 1915 |
| 1,236,742 | Morris | Aug. 14, 1917 |
| 1,251,658 | Hellmund | Jan. 1, 1918 |
| 1,338,367 | Hellmund | Apr. 27, 1920 |
| 1,386,016 | Morris | Aug. 2, 1921 |